(12) United States Patent
Gloes et al.

(10) Patent No.: US 11,038,438 B2
(45) Date of Patent: Jun. 15, 2021

(54) METHODS OF STARTING AN INVERTER SYSTEM, AND INVERTER SYSTEMS

(71) Applicant: GE Energy Power Conversion Technology Limited, Warwickshire (GB)

(72) Inventors: Hendrik Gloes, Berlin (DE); Martin Geske, Berlin (DE); Thomas Brueckner, Berlin (DE)

(73) Assignee: GE Energy Power Conversion Technology Limited, Warwickshire (GB)

(*) Notice: Subject to any disclaimer, the term of this patent is extended or adjusted under 35 U.S.C. 154(b) by 10 days.

(21) Appl. No.: 16/708,401

(22) Filed: Dec. 9, 2019

(65) Prior Publication Data
US 2020/0195168 A1    Jun. 18, 2020

(30) Foreign Application Priority Data

Dec. 7, 2018 (EP) ...................................... 18211113

(51) Int. Cl.
*H02J 3/38* (2006.01)
*H02M 7/5387* (2007.01)
(Continued)

(52) U.S. Cl.
CPC ......... *H02M 7/53871* (2013.01); *H02J 3/381* (2013.01); *H02M 1/32* (2013.01);
(Continued)

(58) Field of Classification Search
CPC ...... H02M 7/53871; H02M 1/32; H02M 1/36; H02M 7/487; H02J 3/381; H02J 300/24; H02J 3/38
See application file for complete search history.

(56) References Cited

U.S. PATENT DOCUMENTS

| | | |
|---|---|---|
| 8,395,919 B2 | 3/2013 | Schroeder et al. |
| 2018/0236874 A1 | 8/2018 | Tsukada et al. |

FOREIGN PATENT DOCUMENTS

| | | |
|---|---|---|
| DE | 102010060633 B3 | 4/2012 |
| EP | 2416480 A2 | 2/2012 |

(Continued)

*Primary Examiner* — Robert L Deberadinis
(74) *Attorney, Agent, or Firm* — Wood IP LLC

(57) ABSTRACT

An inverter system is described. The inverter system includes a DC power source such as a plurality of photovoltaic (PV) panels, an inverter and a controller. The inverter includes a plurality of semiconductor devices (e.g., controllable semiconductor switches such as IGBTs and anti-parallel connected diodes) arranged in a suitable inverter topology. The inverter includes DC input terminals connected to the PV panels by means of a DC link and at least one AC output terminal. When starting the inverter, the controller is configured to enable a short circuit state of the inverter by controlling the semiconductor switches to create a short circuit between the DC input terminals such that the inverter carries a current substantially equal to the short circuit current of the PV panels. This short circuit current may be used to pre-heat the semiconductor devices of the inverter to reduce failure rates caused by cosmic radiation when the semiconductor devices subsequently experience high blocking voltages during normal operation of the inverter.

15 Claims, 9 Drawing Sheets

(51) Int. Cl.
*H02M 1/32* (2007.01)
*H02M 1/36* (2007.01)
*H02M 7/487* (2007.01)

(52) U.S. Cl.
CPC ............ *H02M 1/36* (2013.01); *H02M 7/487* (2013.01); *H02J 2300/24* (2020.01)

(56) References Cited

FOREIGN PATENT DOCUMENTS

| | | |
|---|---|---|
| EP | 2424101 A2 | 2/2012 |
| EP | 2903160 A1 | 8/2015 |
| JP | 2015 116872 A | 6/2015 |

METHODS OF STARTING AN INVERTER SYSTEM, AND INVERTER SYSTEMS

TECHNICAL FIELD

The present invention relates to methods of starting an inverter system, and inverter systems, and in particular to inverter systems that include an inverter (or power converter) for converting a direct current (DC) input voltage into an alternating current (AC) output voltage, for example to be exported to an AC supply network or utility grid.

In one arrangement, the inverter system may be a solar inverter system where a solar inverter is connected to one or more photovoltaic (PV) panels.

BACKGROUND ART

The solar inverter has a critical role in a solar power plant and is used to convert the DC output voltage provided by an array of one or more PV panels to an AC output voltage that may be exported to an AC power network or utility grid.

The solar inverter includes a plurality of controllable semiconductor switches that may be turned on and off according to a suitable control strategy to produce the desired AC output voltage. The suitability of particular semiconductor switches and other semiconductor devices like fast recovery diodes for use in the solar inverter is determined by their technical specification (or data sheet) and includes, for example, their maximum rated collector-emitter voltage or maximum rated current.

EP 2416480 discloses a solar inverter system and a method of starting the solar inverter system at high open circuit voltages, e.g., 1000 VDC or more. The inverter system includes a solar inverter and an inverter pre-charger that is used to pre-charge the inverter prior to connecting the inverter system to an AC utility grid and an array of PV panels. The solar inverter is charged until the DC link voltage reaches a first DC link voltage that is less than a predetermined open circuit voltage of the PV array. The inverter pre-charger is configured to decrease the DC link voltage to a second DC link voltage prior to connecting the inverter system to the PV array and subsequent to connecting the inverter system to the AC utility grid. The second DC link voltage is a minimum voltage level required to control AC grid currents generated via the solar inverter.

Large modern solar power plants are typically rated 1500 VDC, meaning that the DC input voltage for the solar inverter is at maximum 1500 VDC depending on the temperature and insolation of the PV panels and other conditions. The semiconductor power devices of the solar inverter must be rated accordingly. The solar inverter may utilise IGBTs with suitable voltage and current ratings in a suitable circuit topology. For example, IGBTs with a blocking voltage capability of 1200 V may be applied in a three-level neutral point clamped voltage source converter (NPC VSC) topology where each IGBT must block half the DC input voltage, i.e., 750 VDC. In a two-level VSC topology, each IGBT must block the full DC input voltage. Hence semiconductor switches with a voltage rating of 1700 V may be applied to block the DC input voltage of 1500 VDC. In this case, the blocking voltage margin (~200 V) is small. Moreover, since the blocking voltage rating is temperature dependent, it will be less than the datasheet value at lower temperatures. This means that the blocking voltage margin is even smaller for cold semiconductor switches and diodes, for example if the inverter is operated at a temperature of less than about 25° C.

Even improved IGBTs and diodes exhibit unacceptably high failure rates at blocking voltages so close to their blocking voltage rating when they are cold. In general, the blocking capability of all semiconductor switches such as IGBTs, GTOs, IGCTs etc. and power diodes is impaired by failures due to cosmic radiation. For example, single event burnouts (SEBs) due to cosmic rays are known to contribute to the random failure rate. Their occurrence is strongly dependent on switch blocking voltage and on switch temperature. In particular, failure rates increase with higher blocking voltage and with lower junction temperature.

In the case of a solar inverter, it will often have to start up early in the morning when the ambient temperature of the solar inverter—and consequently the junction temperature of the semiconductor switches and diodes—is relatively low. This may lead to a high failure rate of the semiconductor power devices.

The present invention aims to ensure that the semiconductor switches and/or the diodes of the inverter are only used to block high voltages after their junction temperature has been increased to be above a certain temperature (e.g., 75° C.). The present invention may be used when starting the inverter, for example.

SUMMARY OF THE INVENTION

The present invention provides a method of controlling an inverter system (e.g., a solar inverter system that may form part of a solar power plant) comprising:
  a direct current (DC) power source; and
  an inverter (e.g., a solar inverter) including a plurality of semiconductor devices, each semiconductor device including at least a controllable semiconductor switch, the inverter having DC input terminals connected to the DC power source by means of a DC link, and at least one alternating current (AC) output terminal;
  wherein the method comprises the step of:
  with the inverter initially in an off state, enabling a short circuit state of the inverter by controlling semiconductor switches of the inverter (e.g., turning on some or all of the semiconductor switches) to create a short circuit between the DC input terminals such that the inverter carries a current substantially equal to the short circuit current of the DC power source.

Each semiconductor device of the inverter may further include an anti-parallel connected diode, i.e., a diode connected in anti-parallel with its associated controllable semiconductor switch. Any reference herein to "semiconductor device" may refer to the controllable semiconductor switch and/or the anti-parallel connected diode as appropriate. Controllable semiconductor switches that normally include an anti-parallel connected diode would include insulated-gate bipolar transistors (IGBTs), for example. Controllable semiconductor switches that do not normally have or do not need an anti-parallel connected diode would include reverse conducting IGBTs (RC-IGBTs), bi-mode insulated gate transistors (BIGTs) and metal-oxide-semiconductor field-effect transistors that utilise silicon carbon (SiC MOSFETs), for example.

Any reference herein to the "off state" of the inverter may refer to a state in which the inverter has not yet been enabled, but typically will refer to a state where the inverter is enabled but where all of the semiconductor switches are turned off.

Unless otherwise stated, any reference herein to components being "connected" includes both a direct and an indirect electrical connection or coupling, e.g., with the option for components to be electrically connected or coupled together by means of one or more interposing components.

Controlling the inverter to carry the short circuit current through the semiconductor switches that are turned on will increase the temperature of the semiconductor switches as a result of the heat generated through normal conduction losses. If the semiconductor devices include an anti-parallel diode, it will be understood that the diodes will not always conduct the short circuit current so will not always be directly heated as a result of conduction losses. But the diodes may be indirectly heated by the thermal coupling with the associated controllable semiconductor switch, for example through a common baseplate or heat sink, particularly if the switch and diode are integrated in the same package. So it will be understood that the short circuit current may be used to provide both direct and indirect heating to the semiconductor devices of the inverter.

The method may further comprise the step of maintaining the short circuit state of the inverter for a certain period of time, or at least until a temperature of the inverter exceeds a temperature threshold. The period of time may be selected so that the temperature of the inverter is increased but a maximum temperature threshold is not exceeded, for example. The maximum temperature threshold may be selected to prevent the semiconductor devices from being damaged. This may provide some benefit in terms of pre-heating the semiconductor devices without the need to measure the temperature of the inverter.

In general terms, the short circuit state of the inverter may be maintained until a threshold is exceeded or a particular criterion is met, which threshold or criterion could be a time threshold (e.g., a period of time) or a temperature threshold, for example.

The temperature of the inverter may be a measured temperature such as the ambient temperature or a temperature within the inverter cabinet, or a temperature associated with at least one of the semiconductor devices of the inverter.

The temperature that is compared against the temperature threshold may be measured, either directly or indirectly, estimated or otherwise determined in any suitable way. For example, the temperature may be measured directly using a suitable sensor such as a thermistor, thermocouple etc. that might be capable of measuring an internal temperature of a semiconductor device, or a baseplate or heatsink, for example. A measured temperature may be used to estimate or otherwise derive a temperature that cannot itself be measured directly, e.g., the junction temperature of a semiconductor device, which is then compared against the temperature threshold. The temperature may be estimated accurately or determined using a suitable thermal model with one or more input parameters, which might include a measured temperature such as the ambient temperature or the temperature within the inverter cabinet, or one or more electrical parameters of the inverter or the inverter system, for example. The temperature may be determined using one or more measured parameters such as the relatively stable short circuit current and the on-state voltage or voltage drop of one or more of the semiconductor switches with reference to a look-up table or model, for example. The temperature may also be estimated accurately by determining a temperature increase relative to an initial measured temperature, e.g., by integrating conducted short circuit current over time.

The temperature threshold may be set at a level that will allow at least one semiconductor device of the inverter to be heated to a temperature that provides a significant reduction in the failure rate due to cosmic radiation when the at least one semiconductor device experiences high blocking voltages during subsequent operation of the inverter. The temperature threshold may be in the range between about 50° C. to about 125° C. and more preferably between about 75° C. to about 100° C., for example. It is also known that general switching behaviour is temperature dependent and becomes often more difficult to handle at lower temperatures. Therefore, inverter operation is often avoided at low junction temperature. The temperature threshold may be in the range of about 5° C. to about 25° C. in order to provide a minimum operating temperature for the semiconductor devices without the need for external heating.

Preferably, a significant proportion of the semiconductor devices of the inverter, and most preferably all of them, will be heated for a certain period of time or to the temperature threshold, before the short circuit state is disabled.

The DC power source will typically provide a nominal current when it is operating normally and a short circuit current when it is in a short circuit condition. The present invention is particularly applicable to solar inverter systems where the DC power source comprises one or more photovoltaic (PV) panels. This is because the short circuit current of PV panels is only moderately higher, e.g., about 10% to 20%, than their nominal current when the PV panels are operated at their maximum power point (MPP). But it will be readily understood that the present invention is also applicable to other types of DC power sources, e.g., some types of battery or fuel cell.

The inverter may utilise any suitable controllable semiconductor switches, e.g., IGBTs, and anti-parallel connected diodes, which may be arranged in any suitable topology, e.g., two-level VSC topology or a three-level neutral point piloted (NPP) VSC topology, and may be controlled to turn on and off by a controller. The semiconductor devices will be selected to have voltage and current ratings with reference to the particular inverter topology that allows the inverter to regularly and safely carry the short circuit current of the DC power source when the inverter is operated in the short circuit state.

The inverter may include a plurality of phase legs with each phase leg being connected in parallel between positive and negative DC rails of the inverter and to a respective AC output terminal such that the inverter provides a multi-phase AC output voltage. The positive and negative DC rails of the inverter may be connected to or define the DC input terminals of the inverter. Each phase leg will include a plurality of semiconductor switches and optional diodes arranged according to the particular topology. At least some of the semiconductor switches in each phase leg will be connected in series between the DC terminals of the inverter, i.e., between the positive and negative DC rails, or between one of the positive and negative DC rails and any intermediate DC rail or point—a single short circuit path between the positive and negative DC rails may be provided by certain semiconductor switches of two or more of the phase legs via the intermediate DC rail or point. To put the inverter into the short circuit state, the appropriate semiconductor switches of at least one phase leg are controlled to turn on so that a short circuit current generated by the DC power source may flow directly between the positive and negative DC rails. The semiconductor switches in the phase legs may all be turned on simultaneously or in an appropriate sequence within a particular phase leg or on a phase leg-by-phase leg basis, for example. An appropriate sequence may include a suitable switching pattern for the semiconductor switches in one or more of the phase legs. Such a switching pattern may be operated at any suitable switching frequency, e.g., 5 Hz to 5 kHz—a higher switching frequency typically means higher switching losses and hence better heating.

A single short circuit current path may be provided through one or more of the phase legs, or two or more parallel short circuit current paths may be provided through two or more of the phase legs at the same time. A short circuit path may be provided through a first phase leg, then through a second phase leg, then through a third phase leg, then through the first phase leg, and so on, or parallel short circuit paths may be provided through the first and second phase legs, then through the second and third phase legs, then through the first and third phase legs, then through the first and second phase legs, and so on, for example. The semiconductor switches may be controlled in any suitable way, optionally with reference to the short circuit current in the DC link, and may be turned on to provide a short circuit path for any suitable period of time. It will be understood that there should be no intermission between the short circuit paths because this would lead to the capacitors in the DC link being charged. So if the series-connected semiconductor switches in the phase legs are turned on in a phase leg-by-phase leg basis, for example, it is important that there is some overlap between the short circuit paths.

When the inverter is in the short circuit state, conduction losses in the semiconductor switches that are the result of carrying the short circuit current will cause the temperature of the semiconductor switches (and any thermally-coupled diodes) to increase. In some arrangements, anti-parallel connected diodes may also be directly heated by conduction losses as a result of carrying the short circuit current. The short circuit current of the DC power source is therefore used to pre-heat semiconductor devices of the inverter for a certain period of time or so that the temperature of the inverter (e.g., the junction temperature of at least one of the semiconductor devices) exceeds a temperature threshold. Increasing the temperature of the semiconductor devices to about 75° C. on inverter start-up, i.e., before the semiconductor devices experience high blocking voltages during subsequent normal operation of the inverter, may significantly reduce failure rates. Increasing the temperature of the semiconductor devices to a lower temperature (e.g., about 5-25° C.) on inverter start-up may not provide all of the benefits in terms of reducing failure rates, but it allows a minimum operating temperature for the semiconductor devices to be obtained without the need for external heating.

The semiconductor devices of the inverter will normally be cooled by a cooling system during normal operation. In particular, the heat generated as a result of conduction and switching losses during operation of the inverter must be removed in order to prevent the semiconductor devices from overheating. At least when the semiconductor devices are being deliberately pre-heated on inverter start-up, the cooling system may be suitably controlled or even temporarily disabled so as not to hinder that process. In some cases, the cooling system may be suitably controlled to deliberately influence the pre-heating of the semiconductor devices, for example to ensure that the semiconductor devices are heated according to a particular heating profile.

The inverter system may include a DC switch connected between the DC power source and the DC input terminals of the inverter, i.e., as part of the DC link. The inverter system may also include an AC circuit connected to the AC output terminal(s) of the inverter and connectable to an AC supply network or utility grid. The AC circuit may include an AC switch and a transformer, as well as AC line filters etc. The AC output terminal(s) of the inverter may be connected to the AC switch and the AC switch may be connected, in turn, to a primary winding of the transformer, with a secondary winding of the transformer being connectable to the AC supply network or utility grid. The AC circuit may have any suitable number of phases, but three phases would be typical with the inverter having three phase legs, three AC output terminals etc.

In the case of a solar inverter system, the DC switch will normally be closed during the night such that the inverter remains connected to the one or more PV panels which will not be generating power. The AC switch is normally open during the night to disconnect the solar inverter system from the AC power network or utility grid.

The method may be started at any suitable time, e.g., before sunrise, so that the inverter is transitioned from the off state to the short circuit state before the PV panels start to generate power. The method may also be started during the daytime, for example following maintenance or repair and where the DC switch and the AC switch are normally open.

The method may be started in response to a start-up command.

The method may be started with the DC switch open or closed. The AC switch must be open when the inverter is in the short circuit state. The AC switch may be closed after the inverter has been transitioned to the operating state—see below.

The method may further include the step of determining if the DC link voltage exceeds a first voltage threshold. In one arrangement, where the DC switch is closed on start-up, if the first voltage threshold is exceeded, the method may further include the steps of opening the DC switch, discharging the DC link until the DC link voltage does not exceed the first voltage threshold, transitioning the inverter from the off state to the short circuit state, and closing the DC switch. If the first voltage threshold is not exceeded, the method may further include the step of transitioning the inverter from the off state to the short circuit state. In other words, the inverter is only transitioned from the off state to the short circuit state if the DC link voltage does not exceed a first voltage threshold, for example in the range between about 10 to about 100 VDC. If the DC link voltage exceeds the first voltage threshold it would indicate that the capacitors in the DC link are also charged up to the DC link voltage. This could happen if, for example, the method is started after sunrise such that the PV panels have already started to generate power and the DC switch is initially closed. If the inverter is transitioned to the short circuit state, the capacitors in the DC link would also be short circuited and this would result in an unacceptably high short circuit current that could cause serious damage to the semiconductor devices. Opening the DC switch if the DC link voltage exceeds the first voltage threshold allows the DC link to be discharged. In particular, it allows the capacitors in the DC link to be discharged, either passively through a discharge resistor by waiting for a period of time, or actively by carrying out a suitable operation of the inverter or some other action. Once the capacitors are discharged, the inverter may be safely transitioned to the short circuit state and the DC switch may be closed to connect the DC power source.

In one arrangement, where the DC switch is open on start-up, if the DC link voltage exceeds a first voltage threshold (as defined above), the method may further include the steps of discharging the DC link until the DC link voltage does not exceed the first voltage threshold, transitioning the inverter from the off state to the short circuit state, and closing the DC switch. If the DC link voltage does not exceed the first voltage threshold, the method may further include the steps of transitioning the inverter from the off state to the short circuit state, and closing the DC switch. If the method is started with the DC switch open, it will normally be expected that the capacitors in the DC link would not be charged so that the short circuit state of the inverter will be enabled. But if this is not the case, the DC link is discharged as described above until the DC link voltage does not exceed the first voltage threshold. Once the capacitors are discharged, the inverter may be safely transitioned to the short circuit state and the DC switch may be closed to connect the DC power source.

The semiconductor switches of the inverter may be controlled to disable the short circuit state, e.g., to transition the inverter from the short circuit state to the off state or to a zero state where the AC output voltage of the inverter is zero or approximately zero. In the zero state, all of the semiconductor switches are controlled to be in a suitable switching state (i.e., either on or off) such that each output phase of the inverter is connected to the same DC voltage level and the instantaneous AC output voltage is zero.

In one arrangement, the transition from the short circuit state to the off state or the zero state may take place after a certain period of time has elapsed or only when the temperature of the inverter exceeds the temperature threshold (see above). The transition from the short circuit state to the off state or the zero state may use a timing sequence that starts when the short circuit state is enabled, for example. Such a timing sequence may be selected so that the temperature of the inverter is increased but a maximum temperature threshold is not exceeded.

In one arrangement, the short circuit state is disabled only when (i) the temperature of the inverter exceeds the temperature threshold, and/or (ii) the output power of the DC power source exceeds a power threshold. Preferably both of criteria (i) and (ii) will be satisfied before the inverter transitions from the short circuit state to the off state or the zero state. If the temperature of the inverter does not exceed the temperature threshold and the output power of the DC power source does not exceed the power threshold, the inverter will typically be maintained in the short circuit state. There is generally no limit on how long the inverter may remain in the short circuit state until both of criteria (i) and (ii) are met. But it will be understood that separate protective steps may be taken if the power threshold has not yet been exceeded but the temperature of the inverter exceeds a maximum temperature threshold that is higher than the temperature threshold for criterion (i) and may be selected to prevent the semiconductor devices from being damaged. Separate protective steps may be taken if the temperature threshold has not yet been exceeded but the output power of the PV panels (or the short circuit current) exceeds a maximum power (or current) threshold, for example. Suitable protective steps would be taken, such as disabling operation of the inverter system.

The available output power of the DC power source may be determined by any appropriate means, for example, by measuring the short circuit current in the DC link and using this to derive the available output power which is then compared with the power threshold. In the case where the DC power source is one or more PV panels, the relationship between the short circuit current and the available output power of the PV panels is well known—see FIG. 10, for example. The short circuit current may be measured by a suitable sensor (e.g., a current transducer) in the DC link, typically between the DC link capacitor(s) and the DC power source. The same sensor is also capable of providing a measurement of the DC link current during other operating states of the inverter. A suitable voltage sensor may also be provided in the DC link to measure the DC link voltage.

The power threshold may be about 2% of the inverter nominal power, for example.

After the inverter has been transitioned to the off state or the zero state, the DC power source is used to pre-charge the DC link, and in particular to charge the capacitors in the DC link.

The method may further comprise the step of controlling the semiconductor switches of the inverter to transition the inverter from the off state or the zero state to an operating state, e.g., where the inverter is conventionally controlled. The step of transitioning the inverter from the off state or the zero state to the operating state may be carried out if the DC link voltage exceeds a second voltage threshold. The second voltage threshold may be in the range between about 800 and about 1000 VDC, for example, and may be selected as a minimum operating voltage for the inverter system. As mentioned above, during the off state or the zero state, the DC link will be charged by the DC power source. The inverter may then be transitioned to the operating state when the DC link voltage has reached a minimum operating voltage (e.g., 900 VDC) that permits power to be usefully exported from the DC power source to the AC supply network or utility grid, for example. Given the DC power threshold has been met, the DC link voltage will increase very rapidly after the inverter is transitioned from the short circuit state to the off state or the zero state. This means that the temperature of the inverter, and in particular the temperature of the at least one semiconductor device, its baseplate or its heatsink, does not decrease to any significant degree before the inverter is subsequently transitioned to the operating state.

The present invention further provides an inverter system (e.g., a solar inverter system that may form part of a solar power plant) comprising:

a DC power source;

an inverter (e.g., a solar inverter) including a plurality of semiconductor devices, each semiconductor device including at least a controllable semiconductor switch, the inverter having DC input terminals connected to the DC power source by means of a DC link, and at least one AC output terminal; and a controller;

wherein the controller is configured to:

with the inverter initially in an off state, enable a short circuit state of the inverter by controlling semiconductor switches of the inverter (e.g., turning on some or all of the semiconductor switches) to create a short circuit between the DC input terminals such that the inverter carries a current substantially equal to the short circuit current of the DC power source.

The controller may be configured to maintain the short circuit state of the inverter for a period of time, or at least until a temperature of the inverter (e.g., a junction temperature of at least one of the semiconductor devices) exceeds a temperature threshold.

The controller may be configured to disable the short circuit state, e.g., to transition the inverter from the short circuit state to the off state or a zero state as described in more detail above.

The inverter system preferably does not need an external apparatus for pre-charging the DC link that connects the DC input terminals of the inverter to the DC power source.

The DC link may include one or more capacitors.

The controller may receive power from the DC link, e.g., by means of an interposing power converter or from a suitable external power supply. In its simplest practical implantation, the inverter system does not require a voltage measurement from the DC power source-side of the DC switch because control decisions may be made based on a measurement of the short circuit current as described herein.

The controller may be integrated with the inverter or a stand-alone controller, for example.

The controller may be further configured to carry out the method steps described herein.

Technical benefits of the first embodiment of the present invention include:
- a reduction in the failure rate of the semiconductor devices of the inverter, and an increase in reliability and lifetime,
- in the specific case of a solar inverter system, it provides easy and precise detection of the availability of solar power generation before the inverter is started, and
- it does not require a separate pre-charge system for the DC link that connects the inverter to the DC power source, and may be used for start-up of the inverter without connection to the supply network or utility grid.

DRAWINGS

Figure 1:
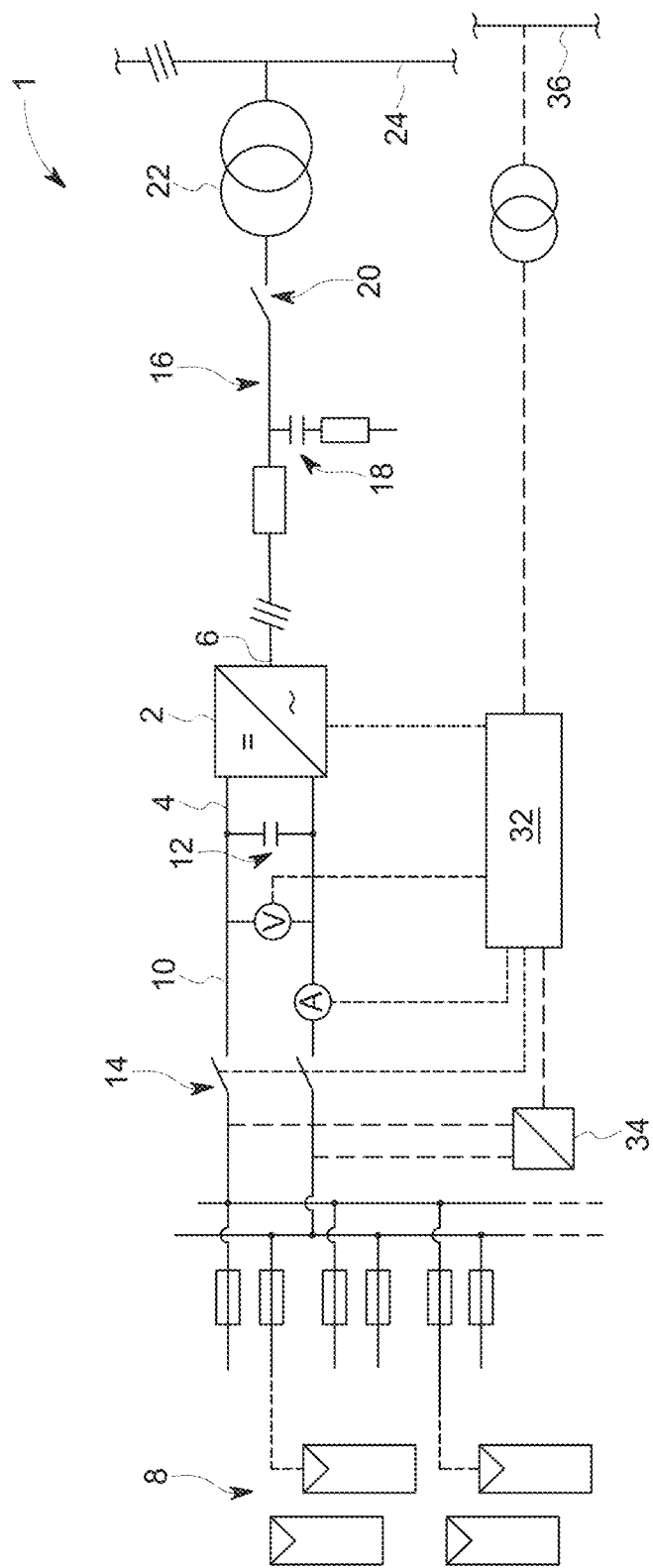
FIG. 1 is a schematic diagram showing a solar inverter system according to the present invention.

FIG. 1 shows a solar inverter system 1 according to the present invention. The solar inverter system 1 includes a solar inverter 2 with two DC input terminals 4 and three AC output terminals 6. The DC input terminals 4 are connected to a plurality of photovoltaic (PV) panels 8 by means of a DC link 10. The DC link 10 includes one or more capacitors 12 and a DC switch 14.

The AC terminals 6 are connected to an AC circuit 16. The AC circuit 16 is a three-phase AC circuit and includes AC filters 18, an AC switch 20 and a transformer 22. The transformer 22 includes a primary winding that is connected to the AC terminals 6 of the solar inverter 2 and a secondary winding that is connected to an AC supply network or utility grid 24.

Figure 2:
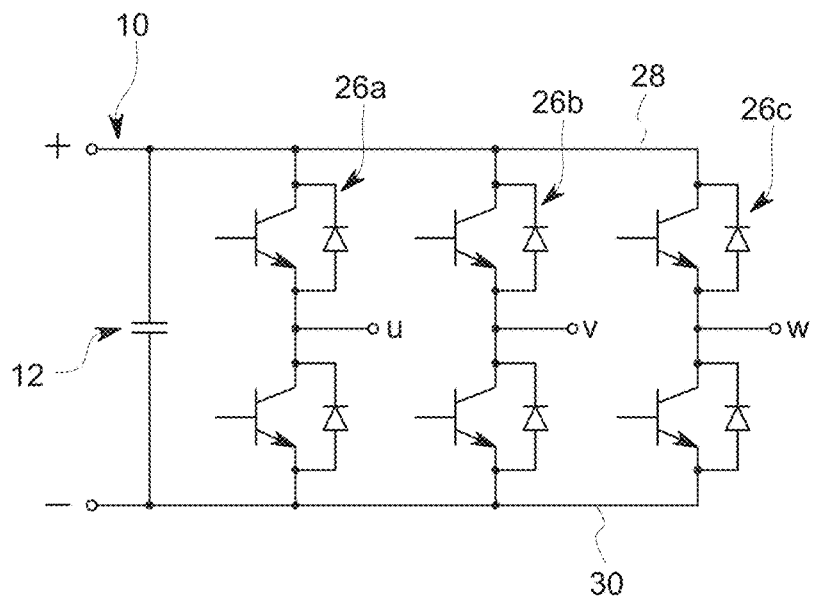
FIG. 2 shows a two-level VSC topology with three phase legs that may be implemented in the solar inverter of the solar inverter system of FIG. 1.
Figure 3:
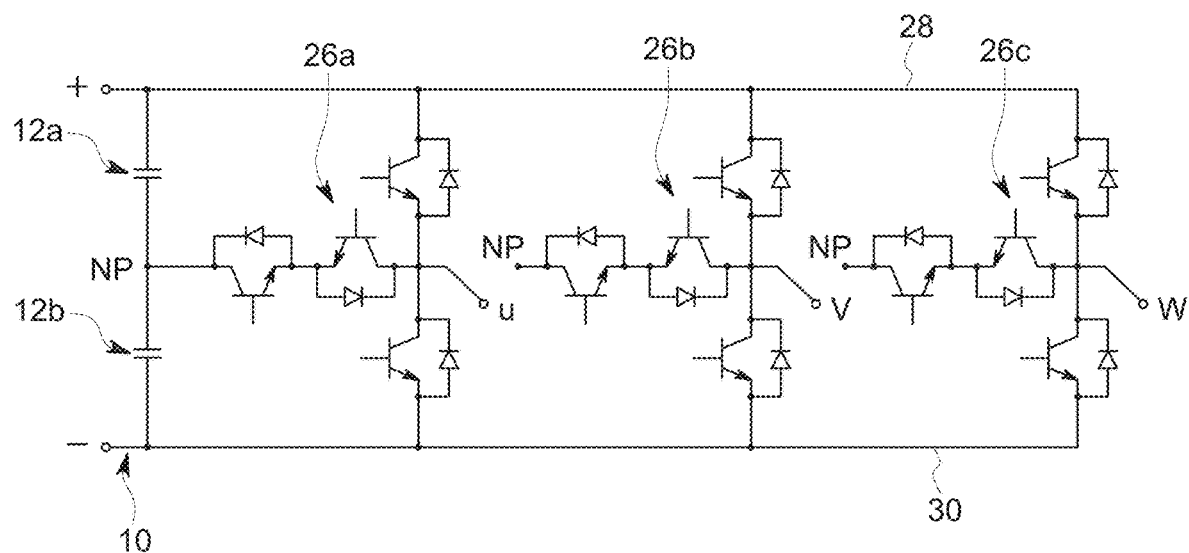
FIG. 3 shows a three-level NPP VSC topology with three phase legs that may be implemented in the solar inverter of the solar inverter system of FIG. 1.

The solar inverter 2 includes a plurality of controllable semiconductor switches, e.g., IGBTs, and anti-parallel connected diodes, which have suitable voltage and current ratings and which are arranged in a suitable topology. FIG. 2 shows a two-level VSC topology with three phase legs 26a, 26b and 26c. FIG. 3 shows a three-level NPP VSC topology with three phase legs 26a, 26b and 26c. It will be readily understood that other topologies may be used in a practical implementation of the solar inverter. Each phase leg 26a, 26b and 26c includes a pair of semiconductor switches connected in series between a positive DC rail 28 and a negative DC rail 30 of the solar inverter 2. The positive and negative DC rails 28, 30 are connected to or define the DC input terminals 4 of the solar inverter 2 and are connected to the DC link 10. Each phase leg 26a, 26b, 26c also defines a respective AC output terminal 6 of the solar inverter 2 and is connected to a corresponding phase (i.e., U, V and W) of the three-phase AC circuit 16. In the case of the three-level NPP VSC topology shown in FIG. 3, the pair of semiconductor switches that are connected in series between the positive and negative DC rails 28, 30 define a first (or "vertical") branch. Each phase leg 26a, 26b and 26c also includes semiconductor switches in a second (or "horizontal") branch that is connected between the point of connection of the semiconductor switches in the first branch and an intermediate DC point (labelled NP) of the DC link 10. A first capacitor 12a is connected between the intermediate DC point and the positive DC rail 28 and a second capacitor 12b is connected between the intermediate point and the negative DC rail 30. The semiconductor switches of the solar inverter 2 are controlled to switch on and off by a controller 32. The controller 32 receives power from the DC link 10 through a power converter 34 or additionally or alternatively from an external power source 36.

The controller 32 receives measurements of DC link current and DC link voltage from suitable sensors or transducers.

Figure 4:
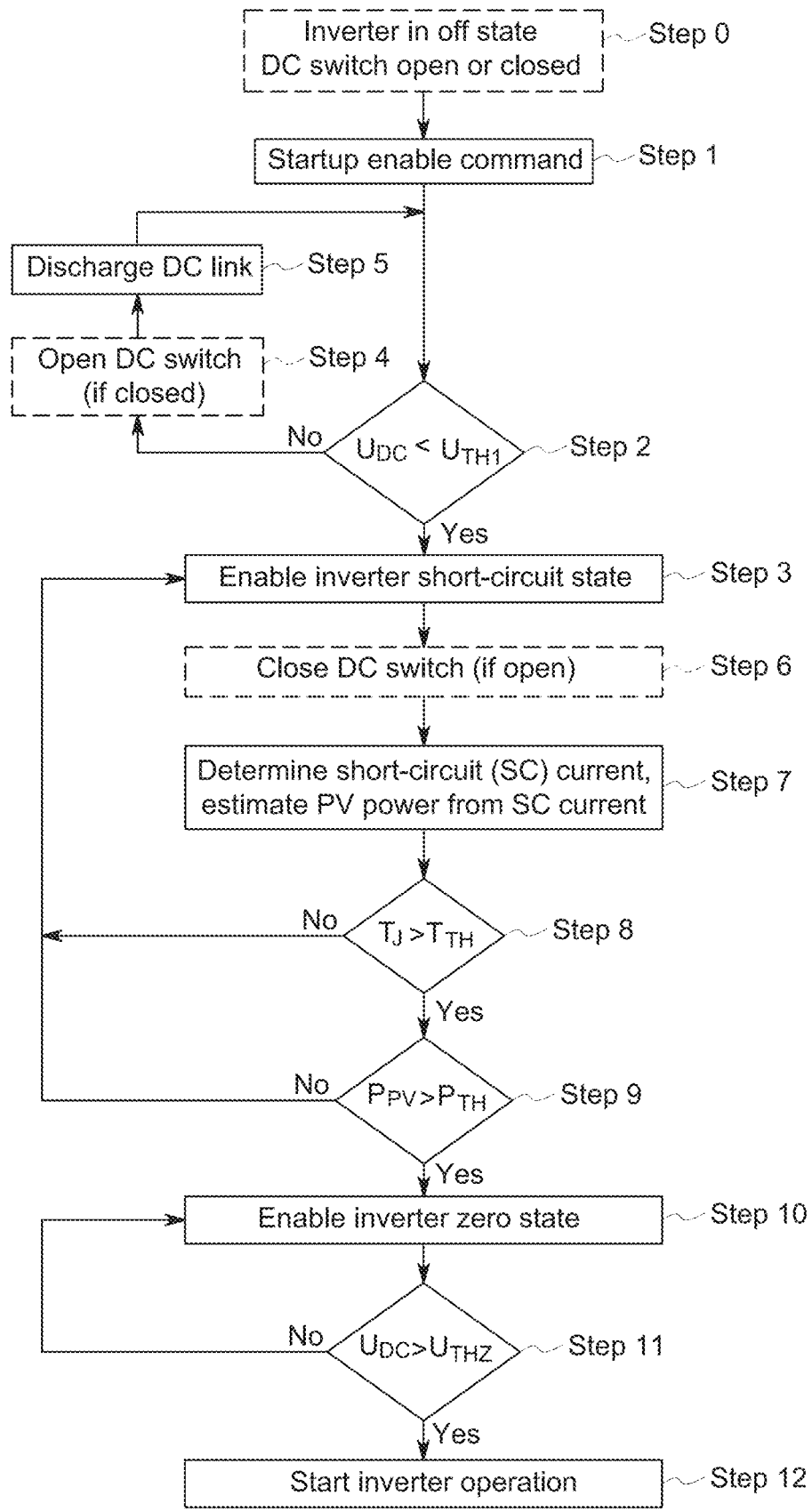
FIG. 4 is a flowchart of a method of starting the solar inverter system of FIG. 1

FIG. 4 is a flowchart of a method of starting the solar inverter system 1 according to the present invention. The method may be started with the DC switch 14 open or closed.

The solar inverter 2 is initially in an off state (step 0). For example, the solar inverter 2 will typically be disabled until it receives a start-up command—see below.

The method is started in response to a start-up command (step 1). The start-up command may be received from a controller for the solar inverter system or the solar power plant, for example. If the DC switch 14 is initially closed, the start-up command may be derived from the DC link voltage, e.g., the start-up command may be initiated if the DC link voltage exceeds a zeroth voltage threshold that would normally be less than the first voltage threshold—see below. On receipt of the start-up command, the solar inverter 2 may be enabled but all of the semiconductor switches will remain in the off state.

At step 2, the method checks to see if the DC link voltage ($U_{DC}$) exceeds a first voltage threshold ($U_{TH1}$). The first voltage threshold may be in the range between about 10 and about 100 VDC, for example. If the first voltage threshold is not exceeded (i.e., $U_{DC} < U_{TH1}$), the solar inverter 2 is transitioned from the off state to a short circuit state (step 3) as described in more detail below.

If the first voltage threshold is exceeded (i.e., $U_{DC} > U_{TH1}$) this indicates that the capacitors 12 in the DC link 10 are also charged up to the DC link voltage. This could happen if, for example, the method is started after sunrise such that the PV panels 8 have already started to generate power and the DC switch 14 is closed. If the solar inverter 2 was to be transitioned to the short circuit state, the capacitors 12 in the DC link 10 would also be short circuited and this would result in an unacceptably high short circuit current that could cause serious damage to the semiconductor switches. Consequently, if the method was started with the DC switch 14 closed, it is opened (step 4) by the controller 32. If the method was started with the DC switch 14 open, for example after maintenance or repair, the DC switch remains open. The capacitors 12 in the DC link 10 are then discharged (step 5), either passively through a discharge resistor (not shown) by waiting for a period of time, or actively by carrying out a suitable operation of the inverter, for example. Once the capacitors 12 are discharged and the first voltage threshold is no longer exceeded (i.e., $U_{DC} < U_{TH1}$), the solar inverter 2 may be safely transitioned to the short circuit state (step 3) and the DC switch 14 may be closed by the controller 32 to connect the PV panels 8 (step 6).

Figure 5:
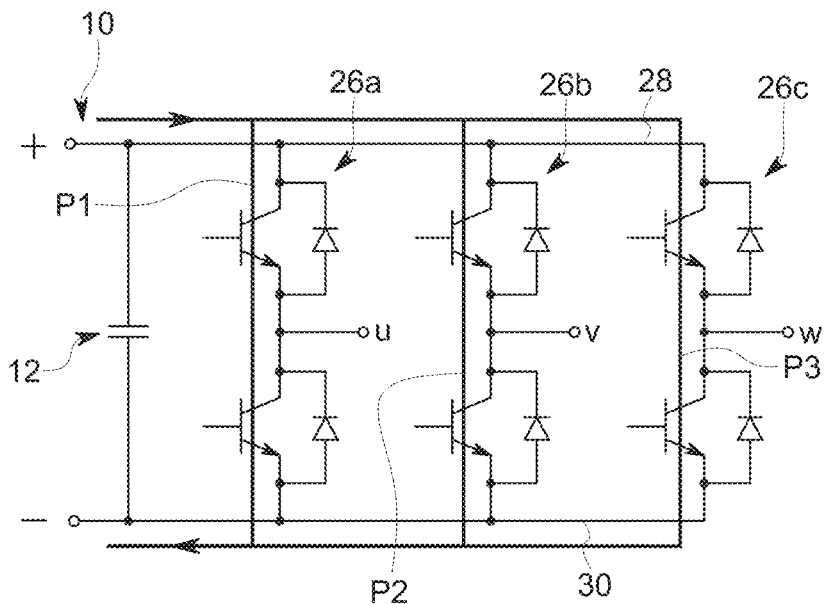
FIG. 5 shows an arrangement with a two-level VSC topology where three parallel short circuit current paths are provided simultaneously through all three the phase legs during the short circuit state.
Figure 6:
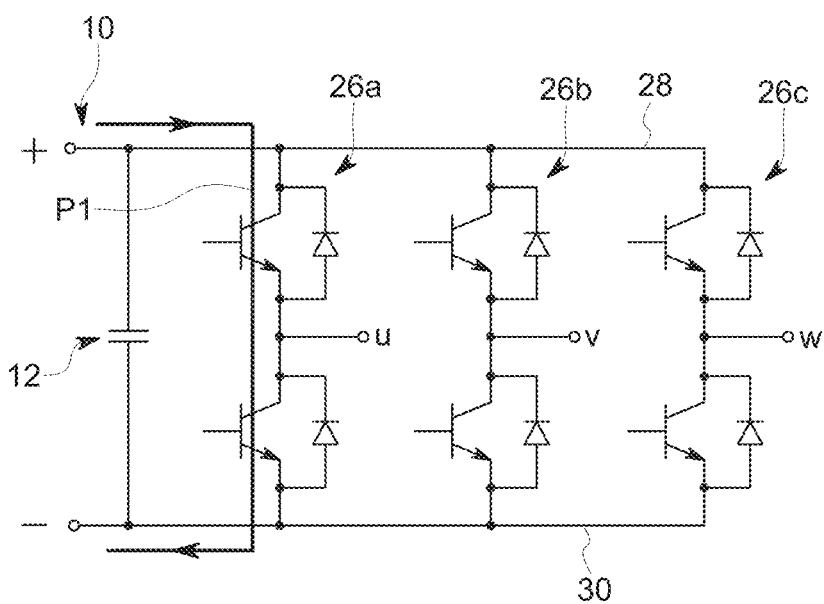
FIGS. 6 to 8 show an arrangement with a two-level VSC topology where a single short circuit path is provided sequentially through each phase leg during the short circuit state.
Figure 7:
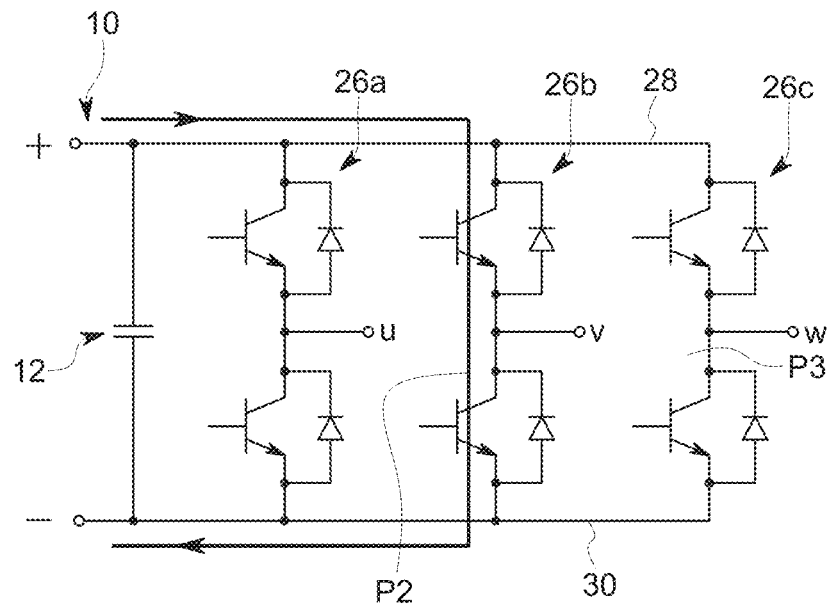
Figure 8:
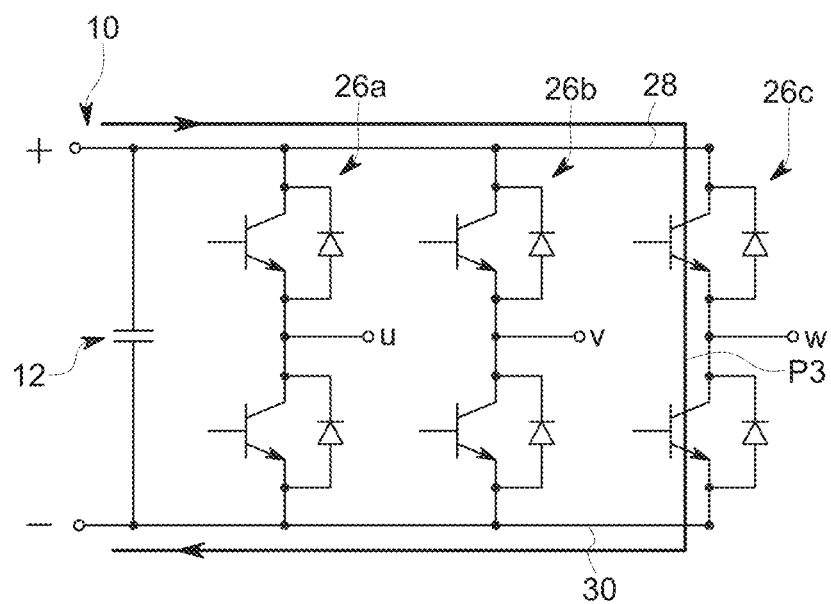

To transition the solar inverter 2 to the short circuit state, semiconductor switches of at least one of the phase legs 26a, 26b and 26c are turned on to provide at least one short circuit current path between the positive and negative DC rails 28, 30, and consequently between the DC input terminals of the solar inverter 2. The PV panels 8 are short circuited and generate a short circuit current which flows along the short circuit path(s) within the solar inverter 2. FIG. 5 shows an arrangement for the two-level VSC topology where both of the semiconductor switches in all three of the phase legs 26a, 26b and 26c are turned on at the same time to provide three parallel short circuit paths P1, P2 and P3 through the phase legs. However, FIGS. 6 to 8 show an arrangement where both of the semiconductor switches in the first phase leg 26a are turned on to provide a short circuit path P1 through the first phase leg while all other semiconductor switches are turned off (FIG. 6), then both of the semiconductor switches in the second phase leg 26b are turned on to provide a short circuit path P2 through the second phase leg while all other semiconductor switches are turned off (FIG. 7), then both of the semiconductor switches in the third phase leg 26c are turned on to provide a short circuit path P3 through the third phase leg while all other semiconductor switches are turned off (FIG. 8), then both of the semiconductor switches in the first phase leg 26a are turned on to provide a short circuit path P1 through the first phase leg while all other semiconductor switches are turned off (FIG. 6), and so on. This provides a short circuit path P1, P2 and P3 on a phase leg-by-phase leg basis. It will be understood that there should be no intermission between the short circuit paths P1, P2 and P3 because this would lead to the capacitors in the DC link 10 being charged. So if the series-connected semiconductor switches in the phase legs 26a, 26b and 26c are turned on in a phase leg-by-phase leg basis, for example, it is important that there is some overlap between the short circuit paths P1, P2 and P3. Other ways of sequentially creating short circuit paths may also be utilised, for example creating two parallel short circuit paths through two of the phase legs at a time.

Figure 9:
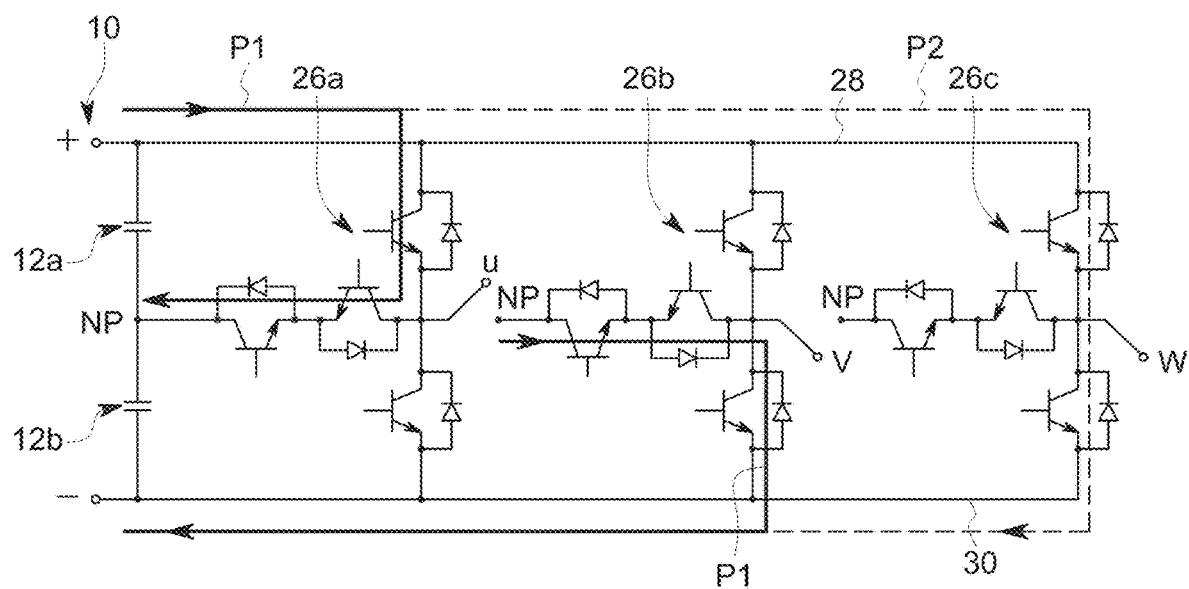
FIG. 9 shows an arrangement with a three-level NPP VSC topology where two parallel short circuit paths are provided simultaneously through all three phase legs during the short circuit state.

FIG. 9 shows an arrangement for the three-level NPP VSC topology where certain semiconductor switches in the first and second branches of the first phase leg 26a and certain semiconductor switches in the first and second branches of the second phase leg 26b are turned on to provide a short circuit path P1 between the first and second DC rails 28, 30 that goes via the intermediate DC point. A corresponding short circuit path could then be provided through the second and third phase legs 26b and 26c, then through the first and third phase legs 26a and 26c, and so on. Such a short circuit path may also provide direct heating of the anti-parallel diodes in the second (or "horizontal") branch of each phase leg 26a, 26b and 26c if the semiconductor switches are controlled to turn on and off in a suitable sequence. For completeness, a second short circuit path P2 is shown where both of the semiconductor switches in the first branch of the third phase leg 26c are turned on. Other ways of sequentially creating short circuit paths through one or more of the phase legs, without intermission, may also be utilised.

The temperature of the semiconductor switches (and in some cases, the anti-parallel connected diodes) carrying the short circuit current will increase as a result of conduction losses etc. Where the diodes are not heated directly, they may be heated indirectly by thermal coupling with the associated semiconductor switch. So it may be understood that by appropriate control of the semiconductor switches in each phase leg, it is possible to pre-heat the semiconductor devices when the solar inverter 2 is started and before the high blocking voltages are applied subsequently during normal operation. This pre-heating may significantly reduce failures rates caused by cosmic radiation such as SEBs which are known to be strongly dependent on blocking voltage and switch temperature. This pre-heating may also allow a minimum operating temperature for the semiconductor devices to be obtained without the need for external heating.

At step 7 of the flowchart of FIG. 4, the available output power of the PV panels 8 is determined, for example using the measured short circuit current.

At step 8, the method checks to see if a temperature ($T_J$) of one or more of the semiconductor devices, e.g., a junction temperature, exceeds a temperature threshold ($T_{TH}$). The temperature may be measured, either directly or indirectly, estimated or otherwise determined in any suitable way as described herein. In one arrangement, the temperature threshold may be in the range between about 50° C. to about 125° C. and more preferably between about 75° C. to about 100° C., for example. In another arrangement, the temperature threshold may be in the range between about 5° C. to about 25° C., for example. If the temperature threshold is not exceeded (i.e., $T_J < T_{TH}$), the solar inverter 2 is maintained in the short circuit state—the method returns to step 3. If the temperature threshold is exceeded (i.e., $T_J > T_{TH}$), the method proceeds to step 9.

At step 9, the method checks to see if the determined available output power of the PV panels ($P_{PV}$) exceeds a power threshold ($P_{TH}$). The power threshold may be about 2% of the inverter nominal power. So for a large modern solar power plant where the solar inverter may be rated at 4 MW 1500 VDC, for example, the power threshold would be about 80 kW. If the power threshold is not exceeded (i.e., $P_{PV} < P_{TH}$), the solar inverter 2 is maintained in the short circuit state—the method returns to step 3. If the power threshold is exceeded (i.e., $P_{PV} > P_{TH}$), the solar inverter 2 is transitioned to a zero state (Step 10). Although not shown, separate protective steps may be taken if the power threshold has not yet been exceeded but the temperature of the inverter exceeds a maximum temperature threshold selected to prevent the semiconductor switches and/or diodes from being damaged. Separate protective steps may be taken if the temperature threshold has not yet been exceeded but the output power of the PV panels (or the short circuit current)

exceeds a maximum power (or current) threshold, for example. Suitable protective steps would be taken, such as disabling operation of the inverter system.

In the zero state the AC output voltage of the solar inverter 2 is zero or approximately zero. In particular, to transition the solar inverter 2 from the short circuit state to the zero state, the semiconductor switches in each phase leg 26a, 26b and 26c are switched to a suitable switching state such that each output phase of the solar inverter (i.e., U, V and W) is connected to the same DC voltage level, e.g. to either the positive or negative DC rails 28, 30 shown in FIG. 2. During the zero state, the PV panels 8 are used to pre-charge the DC link 10, and in particular to charge the capacitors 12 in the DC link.

At step 11, the method checks to see if the DC link voltage ($U_{DC}$) exceeds a second voltage threshold ($U_{TH2}$). If the second voltage threshold is not exceeded (i.e., $U_{DC}<U_{TH2}$), the solar inverter 2 is maintained in the zero state—the method returns to step 10 and the DC link continues to be charged. If the second voltage threshold is exceeded (i.e., $U_{DC}>U_{TH2}$), the solar inverter 2 is transitioned to an operating state (Step 12), i.e., where normal operation of the solar inverter is started. The second voltage threshold may be in the range between about 800 and about 1000 VDC, for example, and may be selected as a minimum operating voltage for the solar inverter system. It may be set with reference to the operating parameters of the solar inverter system or the solar power plant to permit power to be usefully exported from the PV panels 8 to the AC supply network or utility grid 24, for example.

In an alternative arrangement, instead of transitioning the solar inverter 2 from the short circuit state to the zero state, it is also possible to disable the short circuit state and transition the solar inverter to the off state, i.e., where all of the semiconductor switches are in the off state. The rest of the method will be the same.

Figure 10:
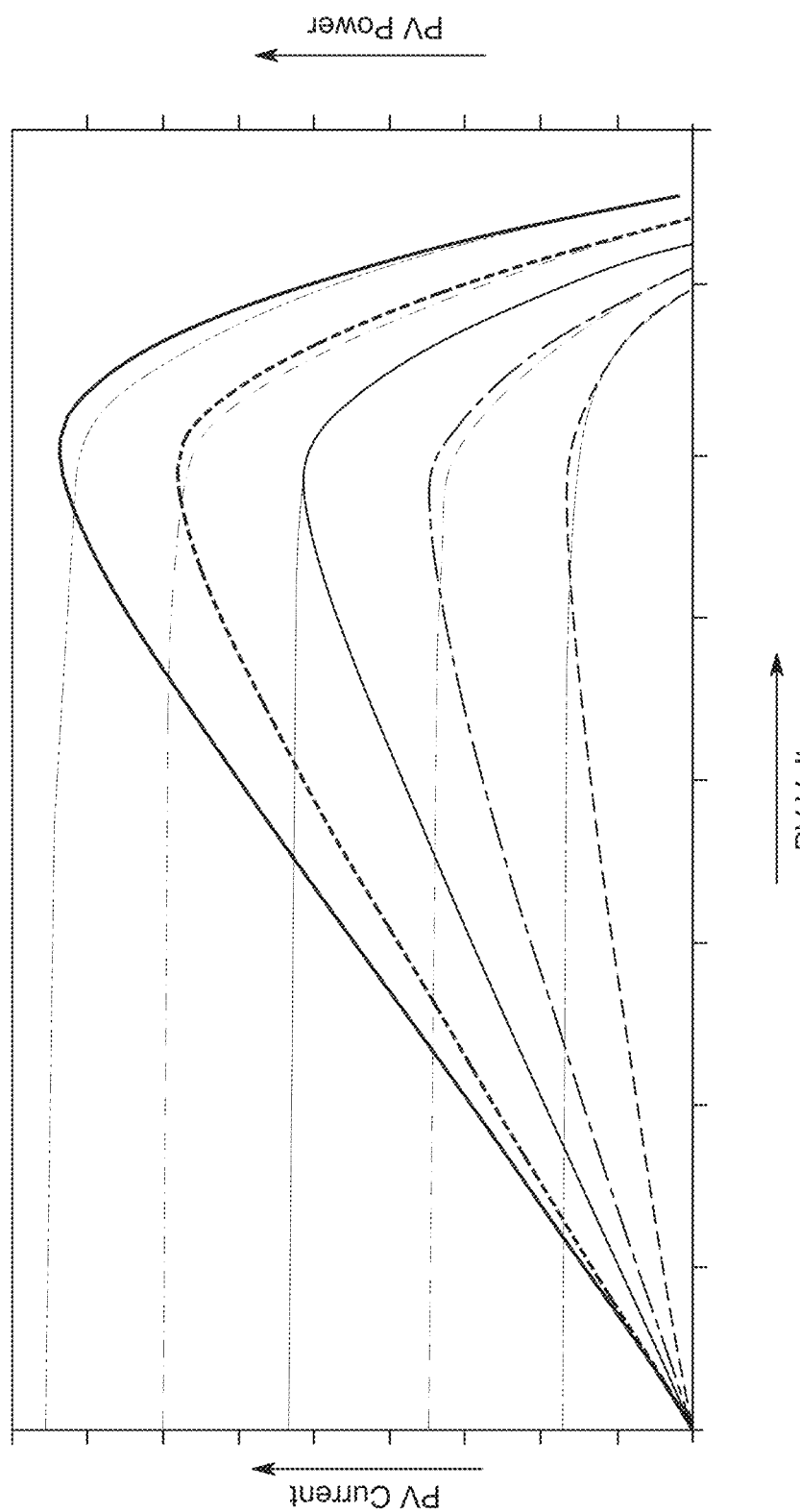
FIG. 10 is a graph showing current versus voltage and power versus voltage curves of a PV panel or an array of PV panels for different insolation levels.

FIG. 10 is a graph showing current versus voltage and power versus voltage curves of a PV panel or an array of PV panels for different insolation levels.

Figure 11:
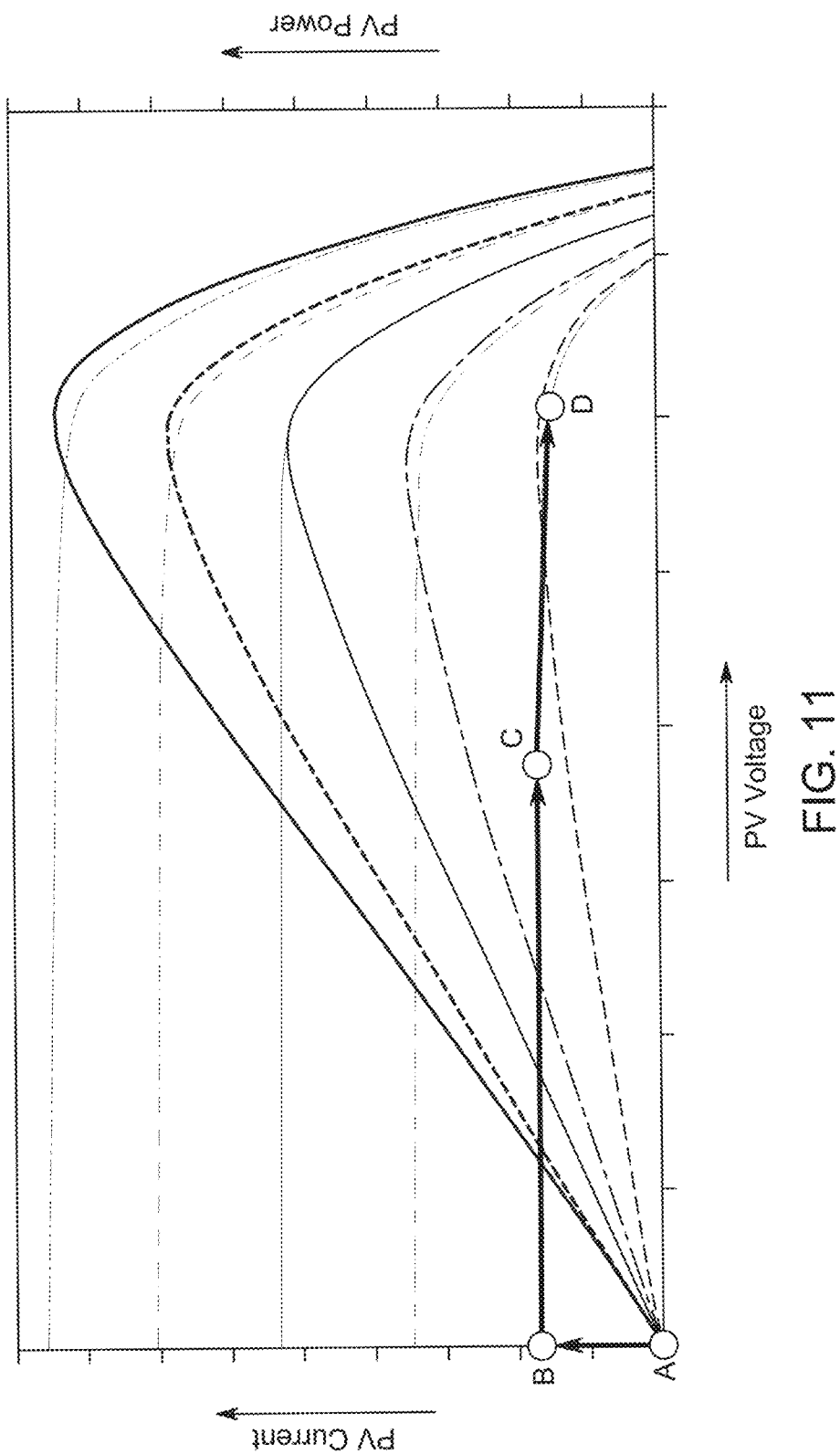
FIG. 11 is the graph of FIG. 10 additionally showing the inverter states when the method is started at or before sunrise with the DC switch initially closed.
Figure 12:
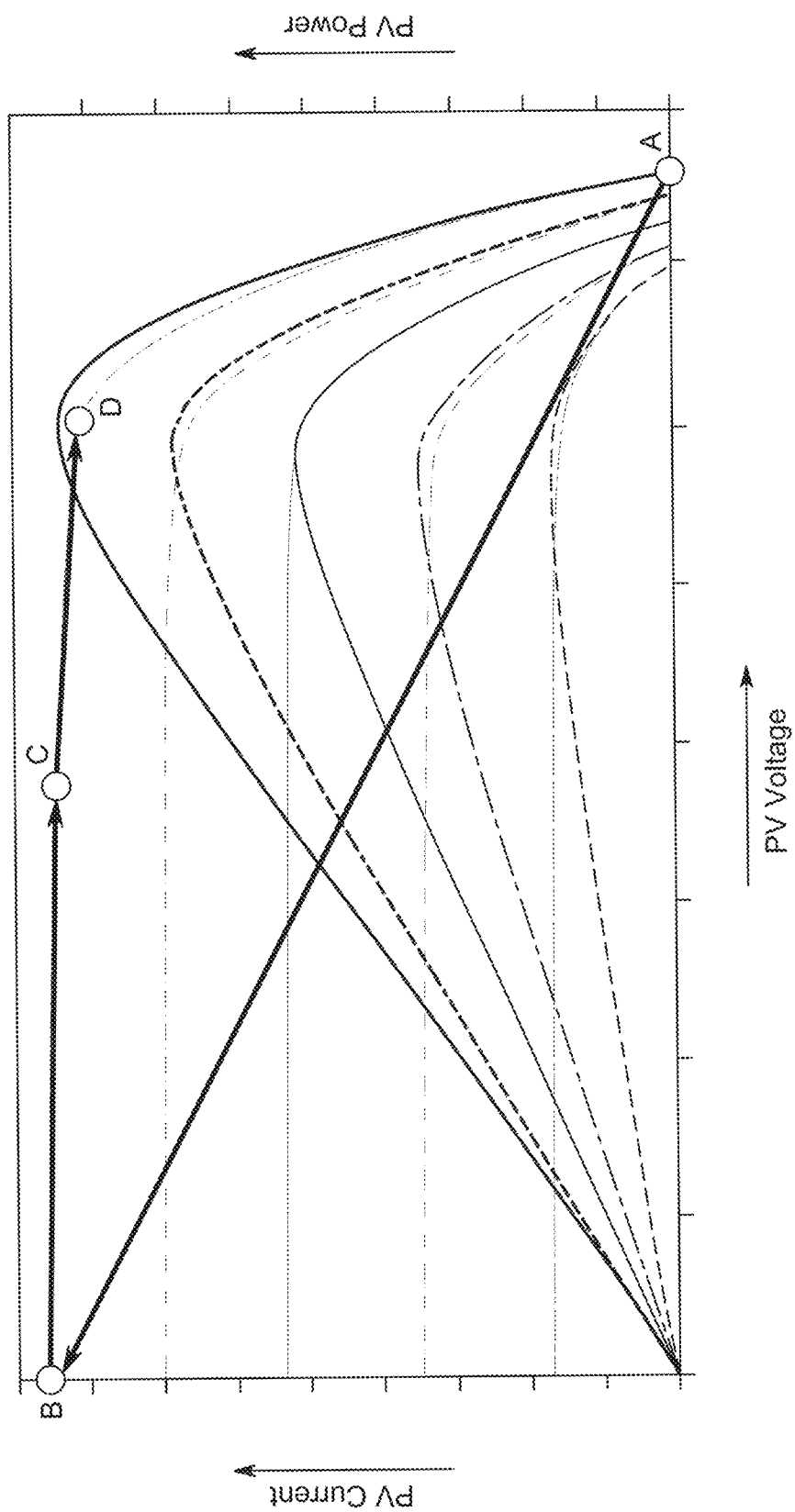
FIG. 12 is the graph of FIG. 10 additionally showing the inverter states when the method is started during the daytime with the DC switch initially open.

FIGS. 11 and 12 are graphs showing the same curves as FIG. 10 but where the inverter states are also indicated. In particular, FIG. 11 indicates the inverter states when the method of FIG. 4 is started before sunrise. The DC switch 14 is initially closed, i.e., the DC link voltage is zero or substantially zero. At point A there is no insolation of the PV panels 8 so there is no open circuit voltage and the solar inverter 2 is in the off state. The method is started and the solar inverter 2 is transitioned to the short circuit state. It remains at point A since there is still no insolation of the PV panels 8. After sunrise, the PV panels 8 start to generate short-circuit current and the operating point moves to the curve corresponding to the actual insolation level towards point B.

When the semiconductor switches have been pre-heated, the solar inverter 2 is transitioned from the short circuit state (point B) to the zero state where the pre-charge of the DC link 10 by the PV panels 8 begins. The operating point moves towards point C. At point C, the DC link voltage exceeds the second voltage threshold (e.g., 900 VDC) and the solar inverter 2 is transitioned to the operating state. In particular, solar inverter operation may be started to bring it to a normal operating state (point D) at the maximum power point (MPP) for the PV panels 8 at the actual insolation level.

FIG. 12 indicates the inverter states when the method of FIG. 4 is started during the daytime with the DC switch 14 initially open, i.e., with high open circuit voltage at the PV panel-side terminals of the DC switch, and the solar inverter is in the off state (point A). The method is started and the solar inverter 2 is transitioned to the short circuit state. The operating point moves to the curve corresponding to the actual insolation level towards point B and the DC switch 14 is closed. When the semiconductor switches have been pre-heated, the solar inverter 2 is transitioned from the short circuit state (point B) to the zero state where the pre-charge of the DC link 10 by the PV panels 8 begins. The operating point moves towards point C. At point C, the DC link voltage exceeds the second voltage threshold (e.g., 900 VDC) and the solar inverter 2 is transitioned to the operating state. In particular, solar inverter operation may be started to bring it to a normal operating state (point D) at the MPP for the PV panels 8 at the actual insolation level.

The invention claimed is:

1. A method of controlling an inverter system comprising:
   a direct current DC power source; and
   an inverter including a plurality of semiconductor devices, each semiconductor device including at least a controllable semiconductor switch, the inverter having DC input terminals connected to the DC power source by means of a DC link, and at least one alternating current AC output terminal;
   wherein the method comprises the step of:
   with the inverter initially in an off state, enabling a short circuit state of the inverter by controlling semiconductor switches of the inverter to create a short circuit between the DC input terminals such that the inverter carries a current substantially equal to the short circuit current of the DC power source.

2. A method according to claim 1, further comprising the step of maintaining the short circuit state of the inverter for a period of time, or at least until a temperature of the inverter exceeds a temperature threshold.

3. A method according to claim 2, wherein the temperature of the inverter is a temperature associated with at least one of the semiconductor devices.

4. A method according to claim 2, wherein the inverter includes a plurality of phase legs, wherein during the short circuit state, semiconductor switches of at least one phase leg are controlled to turn on so that a short circuit current flows between the DC input terminals of the inverter.

5. A method according to claim 4, wherein the series-connected semiconductor switches in each phase leg are turned on simultaneously or in an appropriate sequence.

6. A method according to claim 1, wherein the inverter system includes a DC switch connected between the DC power source and the DC input terminals of the inverter, wherein with the DC switch closed, the method further comprises the steps of:
   if the DC link voltage exceeds a first voltage threshold:
      opening the DC switch,
      discharging the DC link until the DC link voltage does not exceed the first voltage threshold,
      transitioning the inverter from the off state to the short circuit state, and
      closing the DC switch; or if the DC link voltage does not exceed the first voltage threshold:
      transitioning the inverter from the off state to the short circuit state.

7. A method according to claim 1, wherein the inverter system includes a DC switch connected between the DC power source and the DC input terminals of the inverter, wherein with the DC switch open, the method further comprises the steps of:
   if the DC link voltage exceeds a first voltage threshold:

discharging the DC link until the DC link voltage does not exceed the first voltage threshold, transitioning the inverter from the off state to the short circuit state, and closing the DC switch; or if the DC link voltage does not exceed the first voltage threshold:

transitioning the inverter from the off state to the short circuit state, and closing the DC switch.

8. A method according to claim 1, further comprising the step of disabling the short circuit state by transitioning the inverter to the off state or to a zero state where the AC output voltage of the inverter is zero or approximately zero, when (i) the temperature of the inverter exceeds the temperature threshold, and/or (ii) the output power of the DC power source exceeds a power threshold.

9. A method according to claim 8, further comprising the step of transitioning the inverter from the off state or the zero state to an operating state; for example, when the DC link voltage exceeds a second voltage threshold.

10. An inverter system comprising:
a DC power source;
an inverter including a plurality of semiconductor devices, each semiconductor device including at least a controllable semiconductor switch, the inverter having DC input terminals connected to the DC power source by means of a DC link, and at least one AC output terminal; and
a controller;
wherein the controller is configured to:
with the inverter initially in an off state, enable a short circuit state of the inverter by controlling semiconductor switches of the inverter to create a short circuit between the DC input terminals such that the inverter carries a current substantially equal to the short circuit current of the DC power source.

11. An inverter system according to claim 10, wherein the controller is further configured to maintain the short circuit state of the inverter for a period of time, or at least until the temperature of at least one of the semiconductor switches exceeds a temperature threshold.

12. An inverter system according to claim 11, wherein the controller is further configured to disable the short circuit state by transitioning the inverter to the off state or to a zero state where the AC output voltage of the inverter is zero or approximately zero, when the temperature of the inverter exceeds the temperature threshold, and/or the output power of the DC power source exceeds a power threshold.

13. An inverter system according to claim 12, wherein the controller is further configured to transition the inverter from the off state or the zero state to an operating state; for example, when the DC link voltage exceeds a second voltage threshold.

14. An inverter system according to claim 10, further comprising a DC switch connected between the DC power source and the DC input terminals of the inverter and an AC circuit connected to the AC output terminal(s) of the inverter and connectable to an AC supply network or utility grid.

15. An inverter system according to claim 10, being a solar inverter system, wherein the inverter is a solar inverter and the DC power source comprises one or more photovoltaic PV panels.

* * * * *